(12) United States Patent  
Finlayson

(10) Patent No.: US 9,058,667 B2  
(45) Date of Patent: Jun. 16, 2015

(54) DETAIL PRESERVING IMAGE TRANSFER OPERATIONS

(71) Applicant: Apple Inc., Cupertino, CA (US)

(72) Inventor: Graham D. Finlayson, Norwich (GB)

(73) Assignee: Apple Inc., Cupertino, CA (US)

( * ) Notice: Subject to any disclaimer, the term of this patent is extended or adjusted under 35 U.S.C. 154(b) by 327 days.

(21) Appl. No.: 13/754,546

(22) Filed: Jan. 30, 2013

(65) Prior Publication Data

US 2014/0212062 A1 Jul. 31, 2014

(51) Int. Cl.
*G06K 9/40* (2006.01)
*G06T 5/00* (2006.01)

(52) U.S. Cl.
CPC ............. *G06T 5/009* (2013.01); *G06T 5/003* (2013.01); *G06T 2207/20192* (2013.01)

(58) Field of Classification Search
USPC .......................................................... 382/263
See application file for complete search history.

(56) References Cited

U.S. PATENT DOCUMENTS

| 2008/0122953 | A1* | 5/2008 | Wakahara et al. | 348/241 |
| 2009/0003723 | A1* | 1/2009 | Kokemohr | 382/261 |
| 2010/0188531 | A1* | 7/2010 | Cordes et al. | 348/235 |

FOREIGN PATENT DOCUMENTS

WO 2011101662 A1 8/2011

OTHER PUBLICATIONS

"Recovering High Dynamic Range Radiance Maps from Photographs", Paul E. Debevec and Jitendra Malik; SIGGRAPH '97 Proceedings of the 24th annual conference on Computer graphics and interactive techniques, pp. 369-378.

"Fast Bilateral Filtering for the Display of High-Dynamic-Range Images," by Frédo Durund and Julie Dorsey, Laboratory for Computer Science, Massachusetts Institute of Technology; SIGGRAPH '02 Proceedings of the 29th annual conference on computer graphics and interactive techniques, pp. 257-266.

* cited by examiner

*Primary Examiner* — Yon Couso
(74) *Attorney, Agent, or Firm* — Wong, Cabello, Lutsch, Rutherford & Brucculeri, LLP

(57) ABSTRACT

Systems, methods, and computer readable media to approximate edge-preserving transformations with global transfer functions are described. In general, a first transfer function that approximates an edge-preserving operation can be found which, together with an enhancement filter (e.g., dynamic range compression) may be used to generate a global transfer function. Alternatively, a second transfer function may be found that approximates the behavior of the combined first transfer function and enhancement filter. Together the first and second transfer functions may generate a global transfer function. It has been determined that a down-sampled version of an input image may be used to develop the global transfer function. Application of global transfer functions in accordance with this disclosure can generate an output image that exhibits the same overall tonality of the input image without introducing the loss of detail and other artifacts attributable to local processing (e.g., the application of edge-preserving filters).

26 Claims, 3 Drawing Sheets

DETAIL PRESERVING IMAGE TRANSFER OPERATIONS

BACKGROUND

This disclosure relates generally to the field of image processing and, more particularly, to techniques for modifying arbitrary transfer functions (tone curves) so as to effect a desired image enhancement.

Image enhancement methods may be made in either the spatial domain or the frequency domain. Spatial domain approaches perform direct manipulation of image pixel values. Frequency domain approaches modify the image's Fourier transform. In the spatial domain, many image enhancement operations can be implemented as, or approximated by, a transfer function. In general, a transfer function may be represented as any curve that can be drawn on a graph that relates an input image quantity (e.g., brightness, color, hue, saturation) to its output image counterpart (e.g., brightness, color, hue, saturation).

One frequently used image enhancement operation is one in which an image's detail is improved. In Dynamic Range Compression (DRC) operations for example, a transfer function may be used to map a large number of brightness values in an input image into a smaller number of brightness values in an output image for display. As a side-effect, such operations can often result in a flat and visually unappealing image where fine detail is muted. It would therefore be beneficial to provide a mechanism to after an initial transfer function (aka, a tone curve) in a manner that preserves the image's overall visual appearance but improves its fine detail.

SUMMARY

In one embodiment the inventive concept provides a method to approximate an edge preserving (local) transfer function with a global transfer function. The method begins by obtaining an input image and applying an edge preserving operation on it to generate a modified or filtered input image. Edge preserving operations may be realized, for example, with bilateral filters, median filters, and anisotropic diffusion. A mapping between the input and filtered input images, based on minimizing a specified criteria, can then be found. The (global) mapping so found may be applied to the input image to generate an output image that does not exhibit many of the deleterious effects of edge-preserving filters such as haloing. In one embodiment, the specified criteria comprises a difference measure. In another embodiment, an image representing the input image's detail or high-frequency content, may be determined based on a difference between the input and filtered input images. The information content of the detail image may be added or incorporated into the output image so as to preserve the input image's detail. In another embodiment, the input image may be a down-sampled version of a full-resolution image. It has been discovered that even when using a down-sampled input image, the mapping is still effective when applied to the full-resolution image. In yet another embodiment, methods described herein may be implemented in computer program code and, as such, may be utilized in various programmable control devices (e.g., desktop computer systems, laptop computer systems, tablet computer systems, portable/personal entertainment devices and mobile telephones).

DETAILED DESCRIPTION

Figure 1:
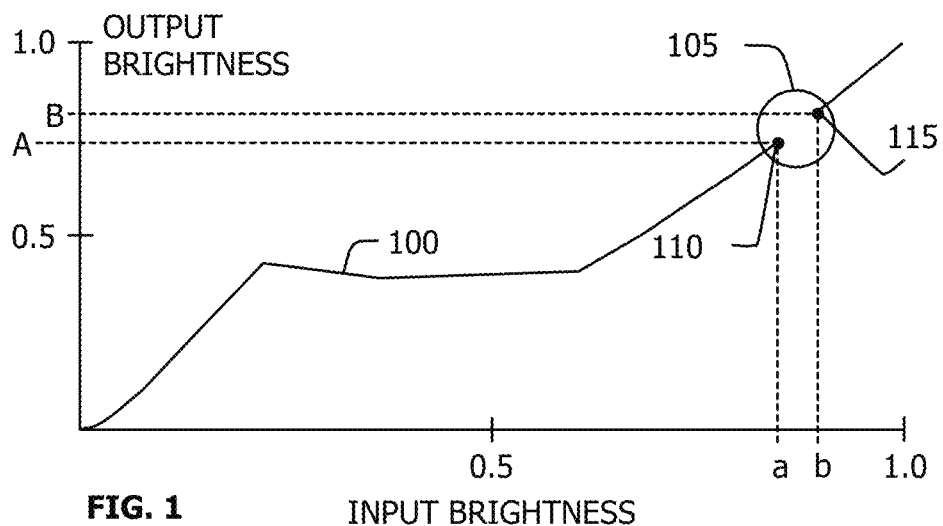
FIG. 1 shows an illustrative detail preserving transfer function in accordance with one embodiment.

This disclosure pertains to systems, methods, and computer readable media for approximating an arbitrary transfer function (e.g., a filter) in a manner that, when the approximation is applied to an image, preserves the image's general tonality while also retaining much of the image's original detail. In general, techniques are disclosed to approximate edge-preserving (i.e. local) transformations with global transfer operators. More particularly, in one embodiment a first transfer function that approximates an edge-preserving operation (e.g., an anisotropic filter) is found which, together with an enhancement filter (e.g., for dynamic range compression) may be used to generate a global transfer function. In another embodiment a second transfer function may also be found (learned) that approximates the behavior of the combined action of the first transfer function and enhancement filter. Together the first and second transfer functions may be combined to generate a global transfer function. Application of either form of global transfer function can generate an output image that exhibits the same overall tonality of the input image without introducing the loss of detail and other artifacts, such as haloing, attributable to local processing (e.g., the application of edge-preserving filters).

In another embodiment, the described techniques may be applied to a down-sampled version of a full-resolution image. It has been discovered that even when based on a down-sampled image, transfer functions generated in accordance with this disclosure provide well-filtered output images when applied to the down-sampled image's corresponding full-resolution image. Use of a down-sampled input image in accordance with this disclosure can significantly reduce the computational cost of filtering a full-resolution image compared to using an edge-preserving filter.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system and business-related constraints), and that these goals may vary from one implementation to another. It will also be appreciated that such development efforts might be complex and time-consuming, but would nevertheless be a routine undertaking for those of ordinary skill in the design an implementation of image processing systems having the benefit of this disclosure.

It will be recognized that an image's pixel values are often recoded prior to the application of a transfer function (e.g., brightness, color, hue). Typical encodings include raising an input pixel's value to a power or taking it's logarithm. In such cases the transfer function is applied in the recoded domain. Output images generated using recoded input values would generally themselves be recoded. For example, if a transfer function is applied to the log of an image's input brightness, it is common that the resulting (transferred) output values be used as exponents before the output image is displayed (i.e. output values are applied to an anti-log function).

There are at least two approaches to preserving image detail when applying a transfer function. Table 1 illustrates a first approach and is generally more common when processing is carried out in the log-domain; on the logarithm of the image's original values, e.g., log(brightness). The approach of Table 2 is generally more common when processing is carried out on the image's original values (e.g., brightness). It can be noted that multiplication and division operations become addition and subtraction operations when the logarithm of an image's pixel values are used (e.g., brightness, luminance, luma or Y).

TABLE 1

Prior Art Log-Domain Detail Preserving Operation

1. Define f( ) as an image enhancement transfer function from log-domain input image $i(x, y)$ to log-domain output image $o(x, y)$; In steps 2-5, all images are in the log-domain
2. Average $i(x, y)$ in an edge-preserving way (e.g., using a bilateral filter) to produce a smoothed image: $I(x, y)$
3. The difference between smoothed image $I(x, y)$ and input image $i(x, y)$ represents high-frequency content, and may be characterized as a detail image: $detail(x, y) = i(x, y) - I(x, y)$
4. Apply transfer function f( ) to smoothed input image $I(x, y)$ to produce an initial output image: $O(x, y) = f(I(x, y))$
5. Incorporate detail information $detail(x, y)$ into initial output image $O(x, y)$ to produce a final output image: $o(x, y) = O(x, y) + detail(x, y) = O(x, y) + i(x, y) - I(x, y)$

TABLE 2

Prior Art Detail Preserving Operation

1. Define f( ) as an image enhancement transfer function from, e.g., brightness input image $i(x, y)$ to output image $O(x, y)$
2. Average $i(x, y)$ in an edge-preserving way (e.g., using a median filter) to produce a smoothed image: $I(x, y)$
3. The difference between smoothed image $I(x, y)$ and input image $i(x, y)$ represents high-frequency content, and may be characterized as a detail image:

$$detail(x, y) = \frac{i(x, y)}{I(x, y)}$$

4. Apply transfer function f( ) to smoothed input image $I(x, y)$ to produce an initial output image: $O(x, y) = f(I(x, y))$
5. Incorporate detail information $detail(x, y)$ into initial output image $O(x, y)$ to produce final output image:

$$o(x, y) = O(x, y) \times detail(x, y) = O(x, y)\left[\frac{i(x, y)}{I(x, y)}\right]$$

Application of either of the approaches outlined in Tables 1 and 2 have at least two well-recognized drawbacks. First, while applying a transfer function is computationally simple, application of an edge-preserving filter such as a bilateral filter is a much more computationally expensive operation. For this reason step 2 is the most computationally expensive aspect of either prior art approach. Second, both approaches can introduce well-known artifacts into an output image. For example, the edges in an output image can sometimes have halos and, in some circumstances, the output image may even exhibit false edges (artifacts that appear as edges in the output image but which are not in the input image). Artifacts of this latter type are due to the imprecise nature of identifying edges; in many images it is not easy to determine what is, and what is not, an edge.

Recognizing these drawbacks, it has been discovered that approximating the effect of an edge-preserving operation (e.g., a bilateral, anisotropic or median filter) with a global transfer function can provide visually appealing results while also avoiding the introduction of the aforementioned artifacts. Table 3 develops a first detail preserving transfer function (dptf1) in accordance with one embodiment. Table 4 develops a second detail preserving transfer function (dptf2) for a log-domain input image in accordance with one embodiment.

TABLE 3

A First Detail Preserving Transfer Function in Accordance with One Embodiment (dptf1)

1. Define f( ) as an image enhancement transfer function from, e.g., brightness input image $i(x, y)$ to output image
2. Average $i(x, y)$ in an edge-preserving way (e.g., using anisotropic diffusion) to produce a smoothed image: $I(x, y)$
3. Learn transfer function g( ) such that $g(i(x, y)) \square I(x, y)$:

$$\min_{g()} \|g(i(x, y)) - I(x, y)\|;$$

for notational simplification let $J(x, y) = g(i(x, y))$
4. Substitute the (learned) transfer function that approximates the edge-preserving operation to produce an initial output image: $O(x, y) = f(g(i(x, y))) = f(J(x, y))$
5. The difference between smoothed image $I(x, y)$ and input image $i(x, y)$ represents a high-frequency detail image:

$$detail(x, y) = \frac{i(x, y)}{I(x, y)} \cong i(x, y) - g(i(x, y)) = i(x, y) - J(x, y)$$

6. Incorporate the detail information from the original input image back into the initial output image $O(x, y)$ to produce a final output image:

$$o(x, y) = O(x, y) \times detail(x, y) = \left[\frac{O(x, y)}{J(x, y)}\right] \times i(x, y)$$

7. Because $O(x, y) = f(g(i(x, y)))$ and $detail(x, y) = \frac{i(x, y)}{g(i(x, y))}$, are both simple transfer functions, and the multiplication of two functions is also a function, $o(x, y)$ may be produced by a single, combined, transfer function:

$$o(x, y) = \frac{f(g(i(x, y)))}{g(i(x, y))} i(x, y) = dptf1(i(x, y))$$

TABLE 4

A Second Detail Preserving Transfer Function for a Log-Domain Input Image in Accordance with One Embodiment (dptf2)

1. Define J( ) as an image enhancement transfer function from log-domain input image $i(x, y)$ to log-domain output image $o(x, y)$; In steps 2-7, all images are in the log-domain TABLE 4-continued A Second Detail Preserving Transfer Function for a Log-Domain
Input Image in Accordance with One Embodiment (dptf2)

2. Average i(x, y) in an edge-preserving way (e.g., using anisotropic diffusion) to produce a smoothed image: I(x, y)
3. Learn transfer function g( ) such that g(i(x, y)) □ I(x, y):

$$\min_{g0} \|g(i(x, y)) - I(x, y)\|;$$

for notational simplification let J(x, y) = g(i(x, y))
4. Substitute the (learned) transfer function that approximates the edge-preserving filter to produce an initial output image:
O(x, y) = f(g(i(x, y))) = f(J(x, y))
5. The difference between smoothed image I(x, y) and input image i(x, y) represents a high-frequency detail image:
detail(x, y) = i(x, y) − I(x, y) = i(x, y) − g(i(x, y))i(x, y) − J(x, y)
6. Incorporate the detail information from the original image back into the initial output image O(x, y) to produce a final output image:
o(x, y) = O(x, y) + detail(x, y) = O(x, y) − J(x, y) + i(x, y)
7. Because O(x, y) = f(g(i(x, y))) and detail(x, y) = i(x, y) − g(i(x, y)), are both simple transfer functions, and the subtraction of two functions is also a function, o(x, y) may be produced by a single, combined, transfer function:
o(x, y) = f(g(i(x, y))) − g(i(x, y)) + i(x, y) = dptf2(i(x, y))

It will be understood that when a log-domain variant such as that presented in Table 4 is used, the logarithm of the input image is determined prior to step 1, and the exponent of the output is determined after step 7.

It may be noticed that if a function g( ) could be found such that J(x,y)=I(x,y), dptf1 and dptf2 would yield results that are identical to operations in accordance with Tables 1 and 2. This is, however, unlikely as edge preserving filters generally employ very local processing procedures. Using a single global transfer function such as dptf1 or dptf2, it is unlikely that an exact match may be made. For simplicity, only the multiplicative form of a detail preserving transfer function in accordance with this disclosure will be dealt with hereinafter. It should be understood, however, that additive form detail preserving transfer functions may be used similarly.

One advantage of dptf2 is that images may be filtered with fewer of the artifacts caused by edge preserving filters. Intuitively, this can be understood by noting that while dptf2 captures certain aspects of edge preserving smoothing, it's operation is not local in nature and so cannot introduce the same kind of local artifacts. It has been found that the number of artifacts dptf2 can remove (relative to the prior implementations outlined in Tables 1 and 2) depends, at least in part, on how the minimization operation in step 3 of Table 4 is implemented. Recognizing this, a designer may use whatever minimization technique they deem appropriate for their particular use. Illustrative minimization techniques include, but are not limited to, quadratic programming, linear-fractional programming, Newton's method, finite difference, approximation theory, and numerical analysis.

It may also be noticed that determination of dptf2 in accordance with Table 4 requires that an edge preserving filter operation be applied to an input image just as in the prior art operations illustrated in Tables 1 and 2 (see step 2 in Table 4). Thus, the time required to determine dptf2 is slightly longer than the prior art operations outlined in Tables 1 and 2.

It has been found, quite unexpectedly, that substantially the same results may be obtained if a down-sampled version of the input image is used in accordance with Table 4 instead of the input image itself. The difference in size between a full-resolution image and a down-sampled version of the same image can be large. By way of example, a down-sampled (thumbnail) version of an 8 megabyte image may be as small as, for example, 3-5 kilobytes. Reducing the size of the image to which an edge preserving filter is applied can dramatically reduce the time required for this aspect of generating dpfts. In one embodiment, generation of a detail preserving transfer function employing a down-sampled input image is outlined in Table 5.

TABLE 5

A Third Detail Preserving
Transfer Function Applied to a Down-Sampled
Input Image in Accordance with One Embodiment (dptf3)

1. Define small(x, y) as a down-sampled version of, e.g., brightness input image i(x, y), and f( ) as an image enhancement transfer function from down-sampled image small(x, y) to output image smallo(x, y)
2. Average small(x, y) in an edge-preserving way (e.g., using a bilateral filter) to produce a smoothed image: smallI(x, y)
3. Learn transfer function g( ) such that g(small(x, y)) □ smallI(x, y):

$$\min_{g0} \|g(small(x, y)) - smallI(x, y)\|;$$

for notational simplification let smallJ(x, y) = g(small(x, y))
4. Substitute the (learned) transfer function that approximates the edge-preserving filter to produce an initial output image:
smallO(x, y) = f(g(small(x, y))) = f(smallJ(x, y))
5. The difference between smoothed image smallI(x, y) and input image small(x, y) represents a high-frequency detail image:

$$smalldetail(x, y) = \frac{small(x, y)}{smallI(x, y)} \cong \frac{small(x, y)}{g(small(x, y))} = \frac{small(x, y)}{smallJ(x, y)}$$

6. Incorporate detail back into initial output image smallO(x, y) to produce a final output image:

$$smallo(x, y) = smallO(x, y) \times smalldetail(x, y) = \left[\frac{smallO(x, y)}{smallJ(x, y)}\right] \times small(x, y)$$

7. Because smallO(x, y) = f(g(small(x, y))) and smalldetail(x, y) = $\frac{small(x, y)}{g(small(x, y))}$, are both simple transfer functions, and the multiplication of two functions is also a function, smallo(x, y) may be produced by a single, combined, transfer function:

$$smallo(x, y) = \frac{f(g(small(x, y)))}{g(small(x, y))} small(x, y) = dptf3(small(x, y))$$

8. Apply dptf3( ) to full-resolution image i(x, y) to generate final output image: o(x, y) = dptf3(i(x, y))

It has been found that because this implementation applies an edge-preserving filter to only a small/thumbnail version of the full-resolution input image (step 2 in Table 5), application of dptf3( ) can provide a 100 times (or more) speedup over the application of prior art detail preserving transfer functions.

In practice, it has been found beneficial to define a detail preserving transfer function in terms of a double approximation as illustrated in Table 6. Because Tables 3 and 6 seek to approximate the effect of spatial filtering, there exists a function h(i(x,y)) that is closer to f(I(x,y)) than the composite function f(g(i(x,y))). If g(i(x,y))=I(x,y) (which is practically never the case), the approached described in Tables 3 and 6 would produce the same result.

TABLE 6

A Fourth Illustrative Detail Preserving Transfer
Function In Accordance with One Embodiment (dptf4)

1. Define f( ) as an image enhancement transfer function from input, e.g., brightness image i(x, y) to output image o(x, y)
2. Average i(x, y) in an edge-preserving way (e.g., using a bilateral filter) to produce a smoothed image: I(x, y)
3. Learn transfer function g( ) such that g(i(x, y)) □ I(x, y):

$$\min_{g()}\|g(i(x, y)) - I(x, y)\|;$$

for notational simplification let J(x, y) = g(i(x, y))

4. Learn transfer function h( ) that approximates the edge-preserving operation such that: h(i(x, y)) ≈ f(I(x, y)):

$$\min_{h()}\|h(i(x, y)) - f(I(x, y))\|$$

5. Substitute the (learned) transfer function h( ) that approximates the edge-preserving filter to produce an initial output image:
O(x, y) = h(i(x, y))
6. The difference between smoothed image I(x, y) and input image i(x, y) represents a high-frequency detail image:

$$\text{detail}(x, y) = \frac{i(x, y)}{I(x, y)} \cong \frac{i(x, y)}{g(i(x, y))} = \frac{i(x, y)}{J(x, y)}$$

7. Incorporate detail back into initial output image O(x, y) to produce a final output image:

$$o(x, y) = O(x, y) \times \text{detail}(x, y) = \left[\frac{O(x, y)}{J(x, y)}\right] \times i(x, y)$$

8. Because O(x, y) = h(i(x, y)) and $\text{detail}(x, y) = \frac{i(x, y)}{g(i(x, y))}$, are both simple transfer functions, and the multiplication of two functions is also a function, o(x, y) may be produced by a single, combined, transfer function:

$$o(x, y) = \frac{h(i(x, y))}{g(i(x, y))} i(x, y) = \text{dptf4}(i(x, y))$$

It should be noted that each of dptf1 through dptf4 provide a one-step transfer function. As such, each of dptf1 through dptf4 may be implemented as a single look-up table. It should further be noted that dptf4 may be developed based on a down-sampled input image just as was dptf3 (see Table 5). That is, once dptf4 has been developed based on a down-sampled input image, it may be applied with nearly equal effect on a full-resolution version of the input image.

In another embodiment in accordance with Tables 5 and 6, a check may be made to determine the fidelity of the dptf3( )/dptf4( ) functions generated at steps 7/8. Specifically, down-sampled image small(x,y) may not include all of the values that are in full-resolution input image i(x,y). This situation can lead to dptf3( )/dptf4( ) having gaps in their mapping from input brightness to output brightness as shown in FIG. 1. There, an example dptf( ) 100 is shown having gap 105 between input brightness levels 'a' and 'b,' corresponding to output brightness levels A and B respectively. When this occurs, it is generally necessary to "fill-in" the gap. This may be done in any manner that "makes sense" for a particular implementation. In one embodiment, this may be done by interpolating (linearly or nonlinearly) between the last known input brightness level value immediately before a gap begins (e.g., point 110) and the first known input brightness level value immediately after the gap ends (e.g., point 115).

Figure 2:
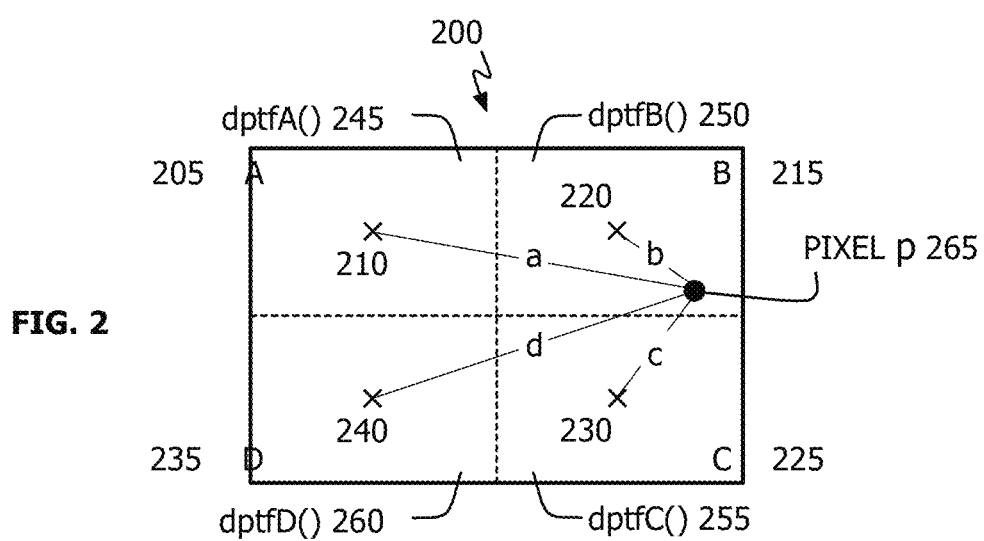
FIG. 2 illustrates a process of using detail preserving transfer functions when an input image is divided into multiple regions in accordance with one embodiment.

In another embodiment, a single input image may be partitioned into a number of regions—with a unique dptf( ) found for each in accordance with Tables 3 through 6. For example, consider FIG. 2 in which image 200 has been partitioned into 4 regions: A 205 (having center point 210), B 215 (having center point 220), C 225 (having center point 230), and D 235 (having center point 240). Considering each region as a separate image, dptfs for each region may be found in accordance with any of Tables 3-6: dptfA( ) 245, dptfB( ) 250; dptfC( ) 255; and dptfD( ) 260. In one embodiment, the output value of a given pixel, 265 for example, may be given as:

$$\text{pixelOutput(pixel } p) = \frac{\text{dptfA(pixel } p)}{\text{distance}(a)} + \frac{\text{dptfB(pixel } p)}{\text{distance}(b)} + \frac{\text{dptfC(pixel } p)}{\text{distance}(c)} + \frac{\text{dptfD(pixel } p)}{\text{distance}(d)},$$

where distance(x) represents a distance function whose input value is 'X'. It should be recognized, different distance measurements may be used as dictated by the particular implementation being considered. In yet another embodiment, each factor above may be modified by an additional weighting factor.

By way of example, let the numeric distance between an arbitrary pixel p to the center of each region A 205, B 215, C 225 and D 235 be: 4, 9, 1 and 0. suitable weights may then be the reciprocal of these distances:

$$\frac{1}{4}, \frac{1}{9}, \frac{1}{1} \text{ and } \frac{1}{0}.$$

Since division by zero is undefined, a better weighting factor may be $$\frac{1}{d+1},$$

where 'd' represents the numeric distance. Using this modified weighting factor, we now have weights:

$$\frac{1}{5}, \frac{1}{10}, \frac{1}{2} \text{ and } \frac{1}{1}.$$

To ensure a normalized output, weighting factors should sum to 1. Since $$\frac{1}{5} + \frac{1}{10} + \frac{1}{2} + \frac{1}{1} = \frac{9}{5},$$

each weight may be normalized by this value, $$\left(\frac{9}{5}\right).$$

The final weighting is then:

$$\frac{1}{5}\left(\frac{5}{9}\right) = \frac{10}{90}, \frac{1}{10}\left(\frac{5}{9}\right) = \frac{5}{90}, \frac{1}{2}\left(\frac{5}{9}\right) = \frac{25}{90} \text{ and } \frac{1}{1}\left(\frac{5}{9}\right) = \frac{50}{90}.$$

Figure 3:
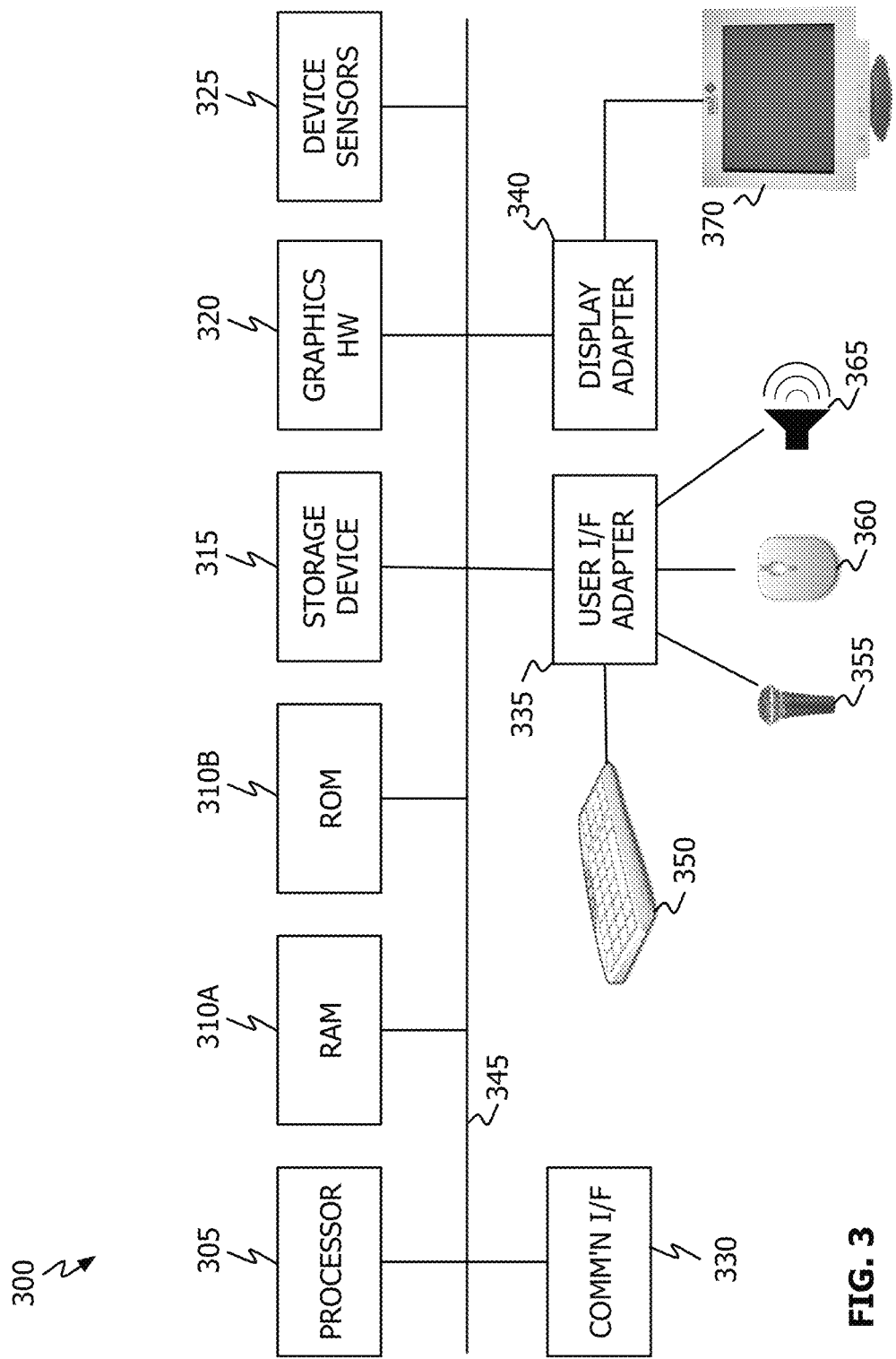
FIG. 3 shows, in block diagram form, a computer system in accordance with one embodiment.

Referring now to FIG. 3, representative computer system 300 (e.g., a general purpose computer system or a dedicated image processing workstation) on which various embodiments of the disclosed operations may execute include one or more processors 305, memory 310 (310A and 310B), one or more storage devices 315, graphics hardware 320, device sensors 325 (e.g., proximity sensor/ambient light sensor, accelerometer and/or gyroscope), communication interface 330, user interface adapter 335 and display adapter 340—all of which may be coupled via system bus or backplane 345. Memory 310 may include one or more different types of media (typically solid-state) used by processor 305 and graphics hardware 320. For example, memory 310 may include memory cache, read-only memory (ROM), and/or random access memory (RAM). Storage 315 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 310 and storage 315 may be used to retain media (e.g., audio, image and video files), preference information, device profile information, computer program instructions organized into one or more modules and written in any desired computer programming language, and any other suitable data. When executed by processor 305 and/or graphics hardware 320 such computer program code may implement one or more of the methods described herein. Communication interface 330 may be used to connect computer system 300 to one or more networks. Illustrative networks include, but are not limited to: a local network such as a USB network; a business' local area network; or a wide area network such as the Internet and may use any suitable technology (e.g., wired or wireless). User interface adapter 335 may be used to connect keyboard 350, microphone 355, pointer device 360, speaker 365 and other user interface devices such as a touchpad and/or a touch screen (not shown). Display adapter 340 may be used to connect one or more display units 370.

Processor 305 (aka processing unit) may be a system-on-chip such as those found in mobile devices and include a dedicated graphics processing unit (GPU). Processor 305 may be based on reduced instruction-set computer (RISC) or complex instruction-set computer (CISC) architectures or any other suitable architecture and may include one or more processing cores. Graphics hardware 320 may be special purpose computational hardware for processing graphics and/or assisting processor 305 process graphics information. In one embodiment, graphics hardware 320 may include one or more programmable graphics processing unit (GPU) and other graphics-specific hardware (e.g., custom designed image processing hardware).

Figure 4:
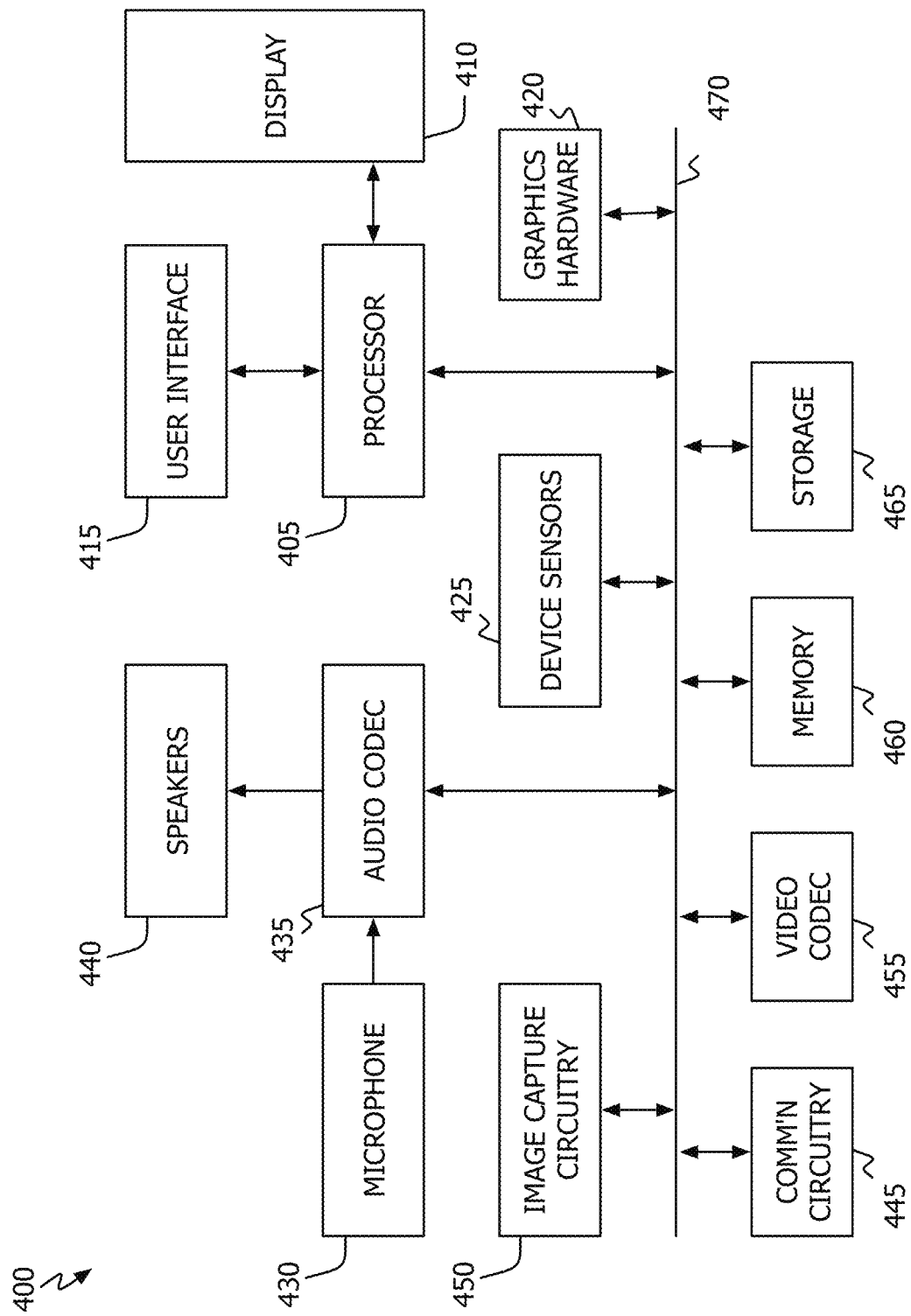
FIG. 4 shows, in block diagram form, a multi-function electronic device in accordance with one embodiment.

Referring to FIG. 4, a simplified functional block diagram of a multifunction electronic device 400 is shown according to one embodiment Electronic device 400 could be, for example, a mobile telephone, personal media device, portable camera, or a tablet, notebook or desktop computer system. As shown, electronic device 400 may include processor 405, display 410, user interface 415, graphics hardware 420, device sensors 425 (e.g., proximity sensor/ambient light sensor, accelerometer and/or gyroscope), microphone 430, audio codec(s) 435, speaker(s) 440, communications circuitry 445, image capture circuit or unit 450, video codec(s) 455, memory 460, storage 465, and communications bus 470.

Processor 405 may execute instructions necessary to carry out or control the operation of many functions performed by device 400 (e.g., such as the generation and/or use of detail preserving transfer functions as disclosed herein). Processor 405 may, for instance, drive display 410 and receive user input from user interface 415. User interface 415 can take a variety of forms, such as a button, keypad, dial, a click wheel, keyboard, display screen and/or a touch screen. Processor 405 may be a system-on-chip such as those found in mobile devices and include one or more dedicated graphics processing units (GPUs). Processor 405 may be based on reduced instruction-set computer (RISC) or complex instruction-set computer (CISC) architectures or any other suitable architecture and may include one or more processing cores. Graphics hardware 420 may be special purpose computational hardware for processing graphics and/or assisting processor 405 perform computational tasks. In one embodiment, graphics hardware 420 may include one or more programmable graphics processing units (GPUs).

Image capture circuitry 450 may capture still and video images that may be processed to generate images and may, in accordance with this disclosure, include the ability to generate and/or use detail preserving transfer function as disclosed herein. Output from image capture circuitry 450 may be processed, at least in part, by video codec(s) 455 and/or processor 405 and/or graphics hardware 420, and/or a dedicated image processing unit incorporated within circuitry 450. Images so captured may be stored in memory 460 and/or storage 465. Memory 460 may include one or more different types of media used by processor 405, graphics hardware 420, and image capture circuitry 450 to perform device functions. For example, memory 460 may include memory cache, read-only memory (ROM), and/or random access memory (RAM). Storage 465 may store media (e.g., audio, image and video files), computer program instructions or software, preference information, device profile information, and any other suitable data. Storage 465 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 460 and storage 465 may be used to retain computer program instructions or code organized into one or more modules and written in any desired computer programming language. When executed by, for example, processor 405 such computer program code may implement one or more of the methods described herein.

It is to be understood that the above description is intended to be illustrative, and not restrictive. The material has been presented to enable any person skilled in the art to make and use the claimed invention and is provided in the context of particular embodiments, variations of which will be readily apparent to those skilled in the art (e.g., some of the disclosed embodiments may be used in combination with each other). For example, while the disclosed embodiments were described in terms of grayscale images (i.e. images based on brightness), such a limitation is not necessary. In the color domain (e.g., the RGB colorspace), detail preserving transfer functions as disclosed herein may be applied to each color channel separately. In addition, constraints may be applied during the process of determining a detail preserving transfer function. In one embodiment, the resulting transfer function could be restricted to being monotonically increasing, to start at zero and to finish at 1 or to have a slope no less than a specified amount. Constraints such as there may be enforced using, for example, quadratic programming techniques. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a processor and comprising instructions stored thereon to cause one or more processors to:
obtain an input image;
obtain an image enhancement transfer function;
apply an edge-preserving operation to the input image to generate a filtered input image;
determine a second transfer function that approximates the edge-preserving operation based, at least in part, on the input image and the filtered input image;
apply the image enhancement and second transfer functions to the input image to generate an intermediate image;
determine a detail information image corresponding to the input image based, at least in part, on the input image and the filtered input image; and
incorporate the detail information image into the intermediate image to generate an output image.

2. The non-transitory program storage device of claim 1, wherein the instructions to cause the one or more processors to determine a second transfer function comprise instructions to cause the one or more processors to determine a mapping based, at least in part, on an image obtained when the second transfer function is applied to the input image and the filtered input image, wherein the mapping is selected to minimize a specified criteria.

3. The non-transitory program storage device of claim 1, wherein the instructions to cause the one or more processors to obtain an input image comprise instructions to cause the one or more processors to:
obtain a full-resolution image; and
down-sample the full-resolution image to generate an input image.

4. The non-transitory program storage device of claim 3, wherein the instructions to cause the one or more processors to obtain a full-resolution image comprise instructions to cause the one or more processors to obtain a full-resolution grayscale image.

5. The non-transitory program storage device of claim 3, wherein the instructions to cause the one or more processors to obtain a full-resolution image comprise instructions to cause the one or more processors to:
obtain an original full-resolution image; and
take a logarithm of the original full-resolution image to generate a full-resolution image.

6. The non-transitory program storage device of claim 5, wherein the instructions to cause the one or more processors to incorporate the detail information image into the intermediate image to generate an output image comprise instructions to cause the one or more processors to:
generate a combined transfer function based, at least in part, on the image enhancement transfer function, the second transfer function and the input image; and
apply the combined transfer function to the full-resolution image to generate an output image.

7. The non-transitory program storage device of claim 6, wherein the instructions to cause the one or more processors to apply the combined transfer function to the full-resolution image to generate an output image further comprise instructions to cause the one or more processors to take the anti-logarithm of the output image to generate a final output image.

8. The non-transitory program storage device of claim 1, wherein the image enhancement transfer function comprises a dynamic range compression transfer function.

9. The non-transitory program storage device of claim 1, wherein the instructions to cause the one or more processors to apply an edge-preserving operation to the input image comprise instructions to cause the one or more processors to apply a bilateral filter to the input image.

10. An image enhancement method, comprising:
obtaining an input image;
obtaining an image enhancement transfer function;
applying an edge-preserving operation to the input image to generate a filtered input image;
determining a second transfer function that approximates the edge-preserving operation based, at least in part, on the input image and the filtered input image;
applying the image enhancement and second transfer functions to the input image to generate an intermediate image;
determining a detail information image corresponding to the input image based, at least in part, on the input image and the filtered input image; and
incorporating the detail information image into the intermediate image to generate an output image.

11. The method of 10, wherein the act of determining a second transfer function comprises determining a mapping based, at least in part, on an image obtained when the second transfer function is applied to the input image and the filtered input image, wherein the mapping is selected to minimize a specified criteria.

12. The method of 10, wherein the act of obtaining an input image comprises:
obtaining a full-resolution image; and
down-sampling the full-resolution image to generate an input image.

13. The method of 12, wherein the act of incorporating the detail information image into the intermediate image to generate an output image comprises:
generating a combined transfer function based, at least in part, on the image enhancement transfer function, the second transfer function and the input image; and
applying the combined transfer function to the full-resolution image to generate an output image.

14. The method of 10, wherein the input and output images are in the log-domain.

15. A non-transitory program storage device, readable by a processor and comprising instructions stored thereon to cause one or ore processors to:
obtain an input image;
obtain an image enhancement transfer function;
apply an edge-preserving filter to the input image to generate a filtered input image;
determine a second transfer function that approximates the edge-preserving filter based, at least in part, on the input image and the filtered input image;
determine a third transfer function that approximates the edge-preserving filter based, at least in part, on the input image and an image resulting from application of the image enhancement transfer function to the filtered input image; and
generate an output image corresponding to the input image based, at least in part, on the second and third transfer functions.

16. The non-transitory program storage device of claim 15, wherein the instructions to cause the one or more processors to obtain an input image comprise instructions to cause the one or more processors to:
obtain a full-resolution image; and
down-sample the full-resolution image to generate an input image.

17. The non-transitory program storage device of claim 15, wherein the input and output images comprise log-domain images.

18. The non-transitory program storage device of claim 15, wherein the instructions to cause the one or more processors to generate an output image comprise instructions to cause the one or more processors to:
- determine an intermediate image based, at least in part, on the third transfer function and the input image;
- determine a detail information image corresponding to the input image based, at least in part, on the second transfer function and the input image; and
- incorporate the detail information image into the intermediate image to generate an output image.

19. The non-transitory program storage device of claim 15, wherein the instructions to cause the one or more processors to determine a second transfer function comprise instructions to cause the one or more processors to determine a mapping between an image obtained when the second transfer function is applied to the input image and the filtered input image, wherein the mapping is selected to minimize a specified criteria.

20. The non-transitory program storage device of claim 15, wherein the instructions to cause the one or more processors to determine a third transfer function comprise instructions to cause the one or more processors to determine a mapping between an image obtained when the third transfer function is applied to the input image and an image obtained when the enhancement transfer function is applied to the filtered input image, wherein the mapping is selected to minimize a specified criteria.

21. An image enhancement method, comprising:
- obtaining an input image;
- obtaining an image enhancement transfer function;
- applying an edge-preserving filter to the input image to generate a filtered input image;
- determining a second transfer function that approximates the edge-preserving filter based, at least in part, on the input image and the filtered input image;
- determining a third transfer function that approximates the edge-preserving filter based, at least in part, on the input image and an image resulting from application of the image enhancement transfer function to the filtered input image; and
- generating an output image corresponding to the input image based, at least in part, on the second and third transfer functions.

22. An electronic device, comprising:
- one or more memories; and
- one or more processors coupled to the one or more memories and adapted to execute program code stored therein, the program code including instructions to cause the one or more processors to—
  - obtain an input image from the one or more memories;
  - obtain an image enhancement transfer function;
  - apply an edge-preserving filter to the input image to generate a filtered input image;
  - determine a second transfer function that approximates the edge-preserving filter based, at least in part, on the input image and the filtered input image;
  - determine a third transfer function that approximates the edge-preserving filter based, at least in part, on the input image and an image resulting from application of the image enhancement transfer function to the filtered input image;
  - generate an output image corresponding to the input image based, at least in part, on the second and third transfer functions; and
  - store the output image in the one or more memories.

23. The electronic device of claim 22, wherein the instructions to cause the one or more processors to obtain an input image comprise instructions to cause the one or more processors to:
- obtain a full-resolution image; and
- down-sample the full-resolution image to generate an input image.

24. The electronic device of claim 22, wherein the instructions to cause the one or more processors to generate an output image comprise instructions to cause the one or more processors to:
- determine an intermediate image based, at least in part, on the third transfer function and the input image;
- determine a detail information image corresponding to the input image based, at least in part, on the second transfer function and the input image; and
- incorporate the detail information image into the intermediate image to generate an output image.

25. The electronic device of claim 22, wherein the instructions to cause the one or more processors to determine a second transfer function comprise instructions to cause the one or more processors to determine a mapping between an image obtained when the second transfer function is applied to the input image and the filtered input image, wherein the mapping is selected to minimize a specified criteria.

26. The electronic device of claim 22, wherein the instructions to cause the one or more processors to determine a third transfer function comprise instructions to cause the one or more processors to determine a mapping between an image obtained when the third transfer function is applied to the input image and an image obtained when the enhancement transfer function is applied to the filtered input image, wherein the mapping is selected to minimize a specified criteria.

* * * * *